March 7, 1933. L. M. PERSONS 1,900,128
RESILIENT SUPPORT FOR ELECTRIC MOTORS
Filed April 9, 1930
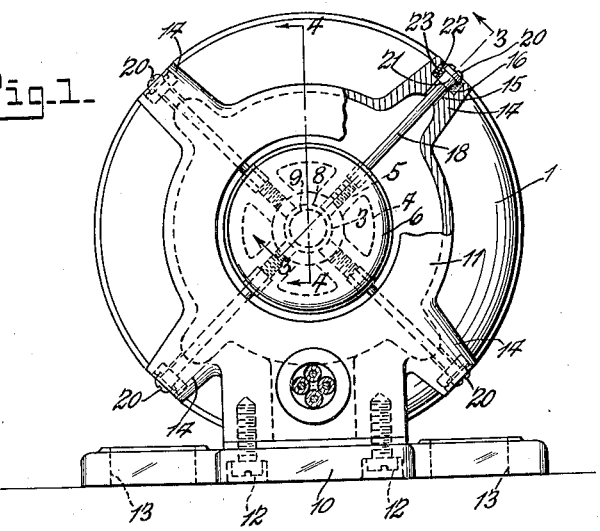
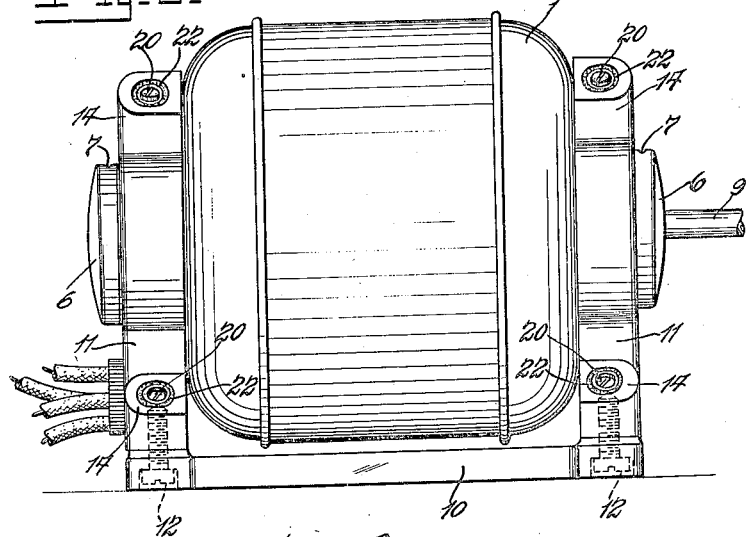
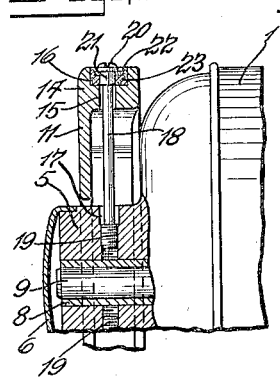 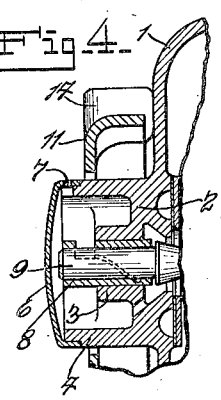
Inventor
Lawrence M. Persons,
by Rippey & Kingsland.
His Attorneys.

Patented Mar. 7, 1933

1,900,128

UNITED STATES PATENT OFFICE

LAWRENCE M. PERSONS, OF ST. LOUIS, MISSOURI, ASSIGNOR TO THE EMERSON ELECTRIC MFG. CO., OF ST. LOUIS, MISSOURI, A CORPORATION OF MISSOURI

RESILIENT SUPPORT FOR ELECTRIC MOTORS

Application filed April 9, 1930. Serial No. 442,828.

This invention relates to supporting means for electric motors.

One of the objects of this invention is to provide a support for an electric motor which will have radial and torsional resiliency sufficient to minimize vibration and thus quiet the operation of the motor.

Other objects will appear from the detail description taken in connection with the accompanying drawing, in which:—

Fig. 1 is an end elevation of the motor showing one of the end star brackets partially in section.

Fig. 2 is a side elevation of the motor with its support.

Fig. 3 is a cross section on line 3—3, Fig. 1.

Fig. 4 is a cross section on line 4—4, Fig. 1.

A motor frame 1 has at each end a hub comprising a closed inner end plate 2, a pair of concentric rings 3 and 4 joined by a series of ribs 5. The hub is closed by a hub cap 6 which has an oil hole 7 and provides in co-operation with the hub a suitable chamber for the reception and retention of a lubricant. The inner ring 3 carries a bushing bearing 8 in which is journalled a shaft 9 supporting the armature. One of the hub caps 6 is bored to accommodate the extruding shaft; otherwise the construction is identical at each end of the motor frame.

The support comprises a base 10 to which is secured a pair of end star brackets 11, each bracket being secured to the frame by a pair of screws 12. The base 10 may be secured to its support by screws passing through slots 13.

Each of the star brackets 11 has a series of circumferential points or lugs 14, each of which has a radial hole 15 and a socket 16 concentric with the hole 15. The points 14 correspond in number and radial location to the ribs 5 on the hub. Each of the ribs 5 has a radial hole 17 provided at its inner end with internal threads.

A series of radial spokes 18 connect the bracket 11 with the hub. Each of the spokes 18 passes through a hole 15 and the threads 19 engage in the threads in a hole 17 in the hub. The spoke may have a screw head 20 and a cylindrical shank 21 of sufficient size that it may bear in one of the holes 15. Each spoke is provided with a rigid washer 22 of a size sufficient to fit the socket 16 and thus center the spoke in the hole 15. A washer 23 of resilient material, such as gum rubber, is situated in the socket 16 about the shank 21 and provides a bearing surface for the rigid washer 22.

The resilient washer 23 is of a diameter to fit the socket 16, but the rigid washer 22 is of a somewhat smaller diameter so that when the spoke is tightened a part of the resilient material will lie between the rigid washer and the wall of the socket thereby preventing a metal to metal contact and thus avoiding the transmission of vibrations.

The arrangement whereby the hole 15 in the point 14 is larger than the spoke, permits radial movement of the spoke with respect to its support without flexing the spoke itself, such movement being opposed by the resiliency of the washer 23. At the same time longitudinal movement of the spoke with reference to its support is permitted by reason of the fact that the cylindrical shank 21 may pass into the hole 15.

The outer ends of the spoke are provided with a screw head whereby they may be engaged by a screw-driver, and the motor may thus be accurately centered with respect to its support by inner and outer adjustments of opposing spokes.

The spokes 18 are described as being radial, but it is to be understood that this expression includes an arrangement where the spokes are not technically radial but inclined at an acute angle to a radial line as, for instance, where the spokes are tangential to a concentric circle about the shaft. Such minor change in the direction of the spoke would not, for most purposes, be material and the word "radial" is, therefore, to be construed to mean substantially radial or at a small acute angle to a radial line.

It will thus be seen that the motor has a resilient connection with its support. Such a construction permits a small amount of radial and torsional movement between the motor and its support, and this is very effective in absorbing the vibration of the motor and its shaft. Such a construction is particularly desirable in motors used for household purposes where vibration or noise is objectionable. At the same time, a simple compact structure has been provided, with suitable means for lubrication of the motor.

It is obvious that various changes may be made in the details of construction within the scope of the appended claims without departing from the spirit of this invention.

I claim:

1. A motor including a frame, a hub on each end of the frame having a series of radial ribs with internal threads, a support having a series of circumferential supporting points, each of said points having a radial hole and a socket concentric with the hole, a resilient washer positioned in each of said sockets and a series of spokes each having a head in one end and external threads on the other, a threaded end engaging a hole in the hub and the head setting in a socket in the support and bearing against the resilient washer.

2. A motor having a frame, a support having a series of holes and sockets concentric with said holes, a series of spokes of substantially less diameter than said holes passing through the holes respectively and engaging in the frame, a resilient washer seated in each of said sockets and about the spoke, and a head on the spoke engaging said resilient washer.

3. A motor having a frame, a support having a series of radial holes and sockets concentric with said holes, a series of radial spokes passing through said holes respectively and engaging by a threaded connection in the frame, a resilient washer seated in each of said sockets and about the spoke, and a head on the spoke engaging said resilient washer and for engagement with a tool for adjustment.

LAWRENCE M. PERSONS.